(12) United States Patent　(10) Patent No.: US 11,976,766 B2
Fortunato et al.　(45) Date of Patent: May 7, 2024

(54) PROTECTIVE TUBE FOR INSERTION INTO A PIPE OR VESSEL WITH REDUCED SENSITIVITY TO VORTEX INDUCED VIBRATIONS

(71) Applicant: Endress+Hauser Wetzer GmbH+Co. KG, Nesselwang (DE)

(72) Inventors: Gianluca Fortunato, Milan (IT); Michele Pietroni, S. Donato (IT); Davide Eralti, Vedano al Lambro (IT)

(73) Assignee: Endress+Hauser Wetzer GmbH+Co. KG, Nesselwang (DE)

( * ) Notice: Subject to any disclaimer, the term of this patent is extended or adjusted under 35 U.S.C. 154(b) by 227 days.

(21) Appl. No.: 17/470,700

(22) Filed: Sep. 9, 2021

(65) Prior Publication Data

US 2022/0074535 A1　Mar. 10, 2022

(30) Foreign Application Priority Data

Sep. 9, 2020　(EP) .................................... 20195284

(51) Int. Cl.
*F16L 55/027*　(2006.01)
*F16L 55/04*　(2006.01)
(Continued)

(52) U.S. Cl.
CPC ....... *F16L 55/02772* (2013.01); *F16L 55/041* (2013.01); *G01K 1/08* (2013.01); *G01K 13/02* (2013.01)

(58) Field of Classification Search
CPC . B63B 2021/504; F15D 1/003; F15D 1/0035; F15D 1/004; F15D 1/0045;
(Continued)

(56) References Cited

U.S. PATENT DOCUMENTS

| 3,076,533 | A |   | 2/1963 | Scruton et al. |
| 4,344,330 | A | * | 8/1982 | Renken ..................... G01F 1/46 73/861.66 |

(Continued)

FOREIGN PATENT DOCUMENTS

| CN | 102679790 A | 9/2012 |
| CN | 108775829 A | 11/2018 |

(Continued)

OTHER PUBLICATIONS

Thermowells—Performance Test Codes. ASME PTC 19.3 TW-2010. The American Society of Mechanical Engineers, 2010. (Year: 2010).*

*Primary Examiner* — David R Deal
(74) *Attorney, Agent, or Firm* — Christopher R. Powers; Endress+Hauser (USA) Holding, Inc.

(57) ABSTRACT

A protective tube for insertion into a pipe or vessel containing a medium, a measuring apparatus having such protective tube and a method for manufacturing the protective tube are disclosed, the protective tube including a tubular member having a bore extending between an upper and lower end of the tubular member and having at least one helical fin on at least a section of an outer surface of the tubular member, winding around the outer surface of the tubular member and defining a flow channel along at least a part of the tubular member. At least one geometric parameter of the at least one helical fin is configured based on at least one process condition of the medium in the vessel or pipe.

14 Claims, 7 Drawing Sheets

(51) Int. Cl.
*G01K 1/08* (2021.01)
*G01K 13/02* (2021.01)

(58) Field of Classification Search
CPC .......... F15D 1/0085; F15D 1/06; F15D 1/065; F15D 1/10; F16L 1/123; F16L 9/006; F16L 55/02772; G01F 1/46
See application file for complete search history.

(56) References Cited

U.S. PATENT DOCUMENTS

| | | |
|---|---|---|
| 4,991,976 A | 2/1991 | Byles |
| 6,390,670 B1 * | 5/2002 | Nimberger ............ G01F 15/02 |
| | | 73/866.5 |
| 7,424,396 B2 | 9/2008 | Dodeja et al. |
| 7,836,780 B2 | 11/2010 | Garnett et al. |
| 2008/0031306 A1 | 2/2008 | Yamada et al. |
| 2009/0211368 A1 | 8/2009 | Garnett et al. |
| 2011/0054822 A1 * | 3/2011 | Bauschke ............ G01K 15/007 |
| | | 374/163 |
| 2013/0142216 A1 | 6/2013 | Kleven |
| 2013/0280027 A1 * | 10/2013 | Francisco ............... F01D 25/30 |
| | | 415/208.1 |
| 2018/0031397 A1 * | 2/2018 | Al Faihan ............ G01D 11/245 |
| 2019/0242792 A1 | 8/2019 | Knight |
| 2021/0164842 A1 * | 6/2021 | Grabenauer ......... G01N 1/2247 |

FOREIGN PATENT DOCUMENTS

| | | |
|---|---|---|
| CN | 208171083 U | 11/2018 |
| CN | 210570202 U | 5/2020 |
| EP | 2884250 A1 | 6/2015 |
| GB | 2433116 A | 6/2007 |
| GB | 2433116 A | 9/2007 |
| GB | 2442488 A | 4/2008 |
| KR | 101598923 B1 | 3/2016 |
| WO | 2020035402 A1 | 2/2020 |

* cited by examiner

PRIOR ART

PROTECTIVE TUBE FOR INSERTION INTO A PIPE OR VESSEL WITH REDUCED SENSITIVITY TO VORTEX INDUCED VIBRATIONS

CROSS-REFERENCE TO RELATED APPLICATION

The present application is related to and claims the priority benefit of European Patent Application No. 20195284.3, filed on Sep. 9, 2020, the entire contents of which are incorporated herein by reference.

TECHNICAL FIELD

The present disclosure generally relates to a protective tube for insertion into a pipe or vessel containing a medium, wherein the protective tube serves for receiving a measuring insert for determining and/or monitoring a process variable of a medium, to an apparatus with such protective tube, and to a method of producing a protective tube according to the present disclosure.

BACKGROUND

Protective tubes in the field of measuring inserts for determining and/or monitoring a process variable of a medium are, e.g., known in the form of thermowells for thermometers which serve for determining and/or monitoring the temperature of a medium. The measuring insert of a thermometer usually at least comprises one temperature sensor for determining and/or monitoring the temperature of the medium. The temperature sensor in turn comprises at least one temperature-sensitive component, e.g., in the form of a resistive element, especially a platinum element, or in the form of a thermocouple. However, protective tubes are also known in connection with gas sampling probes, where a gas sample is, especially dynamically, taken out from a pipe or vessel. The present disclosure thus generally relates to fluid processing and related measurements employing insertion type probe bodies and is not restricted to thermowells or gas sampling probes.

Such protective tubes are frequently exposed to the flow of the respective medium which causes different mechanical forces acting on the protective tube, e. g., shear forces or forces induced by coherent vortex shedding and which can result in vortex induced vibrations (VIV). Vortex shedding in fluid dynamics is known as a "Kámán vortex street" and refers to a repeating pattern of swirling vortices in alternating directions caused by the unsteady separation of flow of a medium around a body, causing said body to vibrate. The closer the frequency of the vibrations is to the natural frequency of the body around which the medium flows, the more the body vibrates. The frequency of the vibrations is, e. g., determined by several process parameters, such as the physical properties of the medium, the flow velocity and the shape of the body.

Due to the high risk of damage of protective tubes subject to VIV, these vibrations need to be duly considered during production. For example, in the case of thermometers, standard methods, such as ASME PTC 19.3 TW-2000, are available, which define several design rules that help to reduce negative effects of coherent vortex shedding. The basic principle underlying the design rules is to increase the natural frequency of vibrations of the thermometer to separate the natural frequency from the vortex shedding frequency. In this way, the dangerous condition of resonant vortex induced vibrations becomes minimized. For this purpose, commonly the geometry of the thermometer is varied, e. g., by reducing its length and/or by increasing its diameter.

Alternatively, when functional constraints don't allow certain changes in the dimensions of the thermometer, mechanical supports or absorbers are frequently used to reduce the thermometer's sensitivity to vortex shedding. These mechanical supports or absorbers are usually fitted into a gap between the opening of the vessel or pipe and the outside surface of the thermometer. The supports or absorbers then increase the natural frequency of the thermometer by reducing the free length of the thermometer. However, it proves difficult to fit the supports or absorbers in such a way that a high level of coupling, and thus the desired effect, can be achieved.

Yet, another approach to reduce VIV of protective tubes is to provide certain structures or structural elements on the protective tube. In this context, helical fins on the outer surface of the protective tube have been proven very successful as, e.g., described in U.S. Pat. Nos. 3,076,533, 4,991,976, 653,931B1, 7,836,780B2, US2013/0142216A1, GB2442488A or WO2020/035402A1 for different configurations.

SUMMARY

Based on these approaches the objective technical problem underlying the present disclosure is to increase the resistance of protective tubes against vortex induced vibrations.

This problem is solved by means of a protective tube, a measuring apparatus and a method of the present disclosure.

Regarding the protective tube, the objective technical problem is solved by means of a protective tube for insertion into a pipe or vessel containing a medium, the protective tube comprising a tubular member having a bore extending between an upper and lower end of the tubular member and having at least one helical fin formed on at least a section of an outer surface of the tubular member, winding around the outer surface of the tubular member and defining a flow channel along at least a part of the tubular member.

According to the present disclosure at least one geometric parameter of the at least one helical fin is chosen such that it depends on at least one process condition of the medium in the vessel or pipe.

The protective tube may be mounted on the pipe or vessel via an opening which may have a process connection for connecting the protective tube to the vessel or pipe. The protective tube at least partially extends into an inner volume of the vessel or pipe and is at least partially in contact with the flowing medium. The protective tube may be arranged such that its longitudinal axis proceeds perpendicular to the flow direction of the medium. However, also angles between the longitudinal axis and the flow direction different from 90° can be employed.

The present disclosure provides a protective tube with at least one customized helical fin that is chosen in dependence of the specific applied process. That way, the stability of the protective tube towards coherent vortex shedding can be optimized. Several embodiments exist for providing a customized thermowell according to the present disclosure, out of which several especially preferred embodiments are described subsequently.

In one embodiment, the process condition is at least one of a flow profile, a flow velocity, a pressure, a temperature, a density or a viscosity of the medium, a diameter, volume or roughness of the pipe or vessel, or a length or diameter of the tubular member. All these medium and pipe/vessel related parameters have an impact on VIV. The geometric parameters characterizing the helical fins are functions of the process conditions.

Another embodiment comprises that the geometric parameter is at least one parameter defining the form and/or shape of the flow channel and/or the at least one helical fin, especially a height, a pitch, a width, or a shape of the at least one helical fin, or a cross-sectional area of the flow channel. By choosing the geometric parameter in dependence of at least one process condition the resistivity against VIV is drastically improved.

The protective tube can be used in a wide range of applications and can, e.g., be part of a gas sampling probe with an inlet and outlet end or a Pitot tube. However, in one embodiment, the protective tube is a thermowell, and the tubular member is closed in one end section.

One embodiment of the protective tube further comprises that the cross-sectional area of the flow channel is designed such that it has a predefined shape and/or size, which is chosen depending on the at least one process condition of the medium in the vessel or pipe. To suppress VIV, the flow channels should provide a suction mechanism for converting kinetic energy of the medium into pressure variations. That way, the sensitivity towards coherent vortex shedding becomes reduced.

In this concern, it is of advantage, if the predefined shape and/or size of the cross-sectional are of the flow channel is constructed by removing at least one predetermined volume section from the at least one helical fin and/or from a wall of the tubular member in the area of the flow channel. That way the suction mechanism can be maximized.

Another embodiment of the protective tube comprises that a size and/or shape of the at least one helical fin and/or the cross-sectional area of the flow channel varies along an axis of the tubular member. That way, the specific influence of the flow profile can be taken into account again drastically increasing the resistance of the protective tube against coherent vortex shedding.

The objective technical problem is also solved by means of a measuring apparatus for determining and/or monitoring a process variable of a medium, comprising a protective tube according to any of the embodiments described in connection with the protective tube.

In one embodiment of the measuring apparatus, the protective tube serves for receiving a measuring insert for determining and/or monitoring a process variable of a medium, especially the temperature of a medium.

Finally, the objective technical problem is solved by means of a method of producing a protective tube for insertion into a pipe or vessel containing a medium, the protective tube comprising a tubular member having a bore extending between an upper and lower end of the tubular member and having at least one helical fin formed on at least a section of an outer surface of the tubular member and winding around the outer surface of the tubular member.

The method comprises the step of choosing at least one geometric parameter of the at least one helical fin such that it depends on at least one process condition of the medium in the vessel or pipe.

In one embodiment of the method, the at least one geometric parameter of the at least one helical fin is chosen based on a calculation, in particular a numerical calculation, of the mechanical behavior of the protective tube inside the pipe of vessel under the at least one process condition.

In another embodiment of the method, an installation position and/or the presence of flow modifying elements, e.g., a pipe corner piece, valve, filter, nozzle or another measuring probe, within a pipe system is/are considered for choosing the at least one geometric parameter of the at least one helical fin.

One embodiment comprises that a size of the at least one section of the outer surface of the tubular member, which comprises the at least one helical fin, is chosen in dependence of the at least one process condition.

It should be noted that the embodiments described in connection with the protective tube and the measuring apparatus are mutatis mutandis applicable to the proposed method and vice versa.

BRIEF DESCRIPTION OF THE DRAWINGS

The present disclosure will now be explained in more detail by means of the following drawings.

In the figures, the same elements are always provided with the same reference symbols.

DETAILED DESCRIPTION

Figure 1:
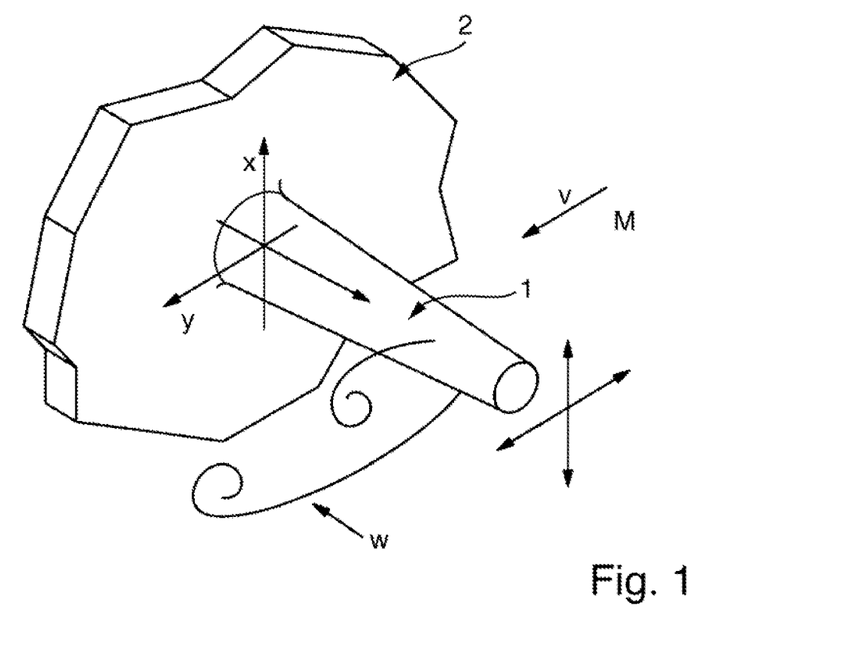
FIG. 1 illustrates the origin of vortex shedding for an insertion body exposed to a flowing medium.

FIG. 1 illustrates the origin of vortex shedding w at a cylindrical, conically tapered protective tube 1 exposed to a flowing medium M in a pipe 2, which is indicated by one of its walls. Downstream of the protective tube 1 in the flow direction v of the medium, a ridge-like pattern develops. Depending on the flow velocity v of the medium M, this can lead to coherent vortex shedding which in turn may cause the protective tube 1 to vibrate.

The vibrations are mainly due to two forces acting on the protective tube 1, a shear force in the in y-direction and a lifting force in x-direction. The shear force causes oscillations at a frequency fs, while the lifting force causes oscillates at a frequency of 2 fs. The frequency fs now depends on the flow velocity v of the medium M, and on various physical or chemical medium properties such as its viscosity and density, as well as on the dimensions of the protective tube 1, such as its diameter and length. The closer the frequency fs is to the natural frequency of the protective tube 1 and the higher the flow velocity v of the medium M, the greater are the resulting oscillation causing forces.

As a result of the vibration causing forces, the protective tube 1 can be damaged or even break down completely. This is known as the so-called resonance condition.

Figure 2A:
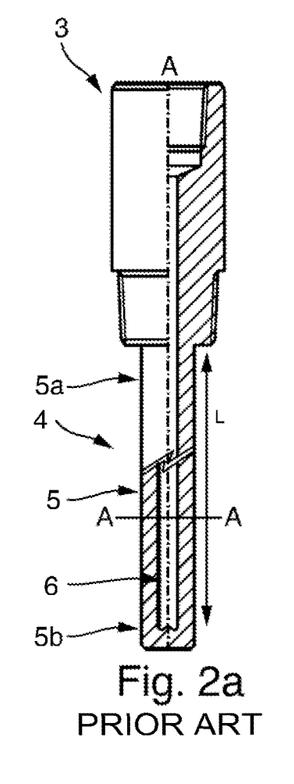
FIGS. 2a-2c show views of a thermometer having a state of the art thermowell.
Figures 2B, 2C:
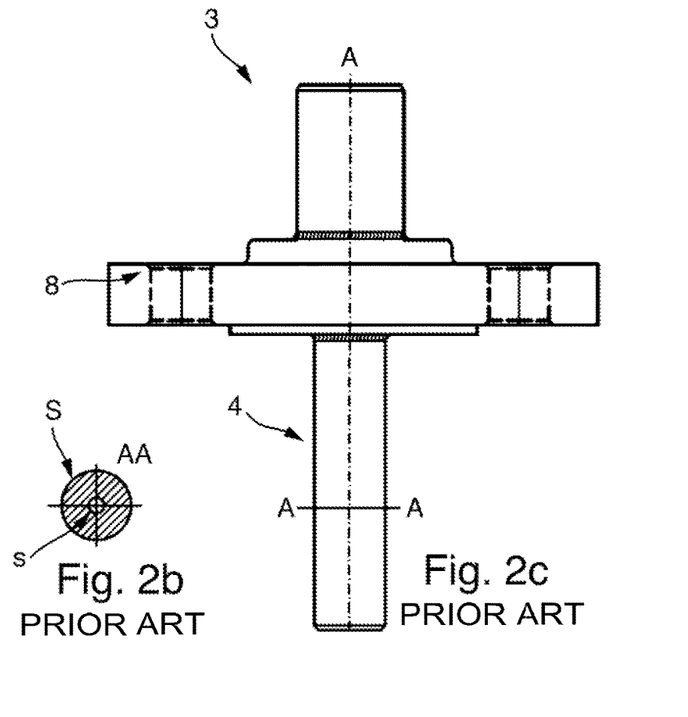

FIGS. 2a-2c exemplarily and without limitation to such embodiment show a state of the art thermometer 3 having a protective tube in the form of a thermowell 4. As can be seen in FIG. 2a, the thermowell 4 comprises a tubular member 5 having a first end section 5a and a second end section 5b with a closed end. The tubular member 5 further comprises a bore 6 forming a hollow space within the tubular member 5, which is defined by an inner surface s and a predeterminable length L parallel to a longitudinal axis A of the tubular member 5, which bore 6 serves for receiving a measuring insert (not shown) for determining and/or monitoring the process variable, e.g., the temperature of the medium M.

Further, as illustrated in FIG. 2c, a process connection 8 is provided, which exemplarily is attached to the tubular member 5, here. This process connection 8 is a fastening member and serves for mounting the thermowell 4 to the pipe 2 (not shown) such that the tubular member 5 at least partially extends into an inner volume of pipe 2 and such that it is at least partially in contact with the flowing medium M.

The outer surface S the thermowell 4 of FIG. 2c has an essentially round shape as becomes visible in FIG. 2b. However, such construction can easily lead to undesired vortex induced vibrations of the thermometer 3.

Figure 3A:
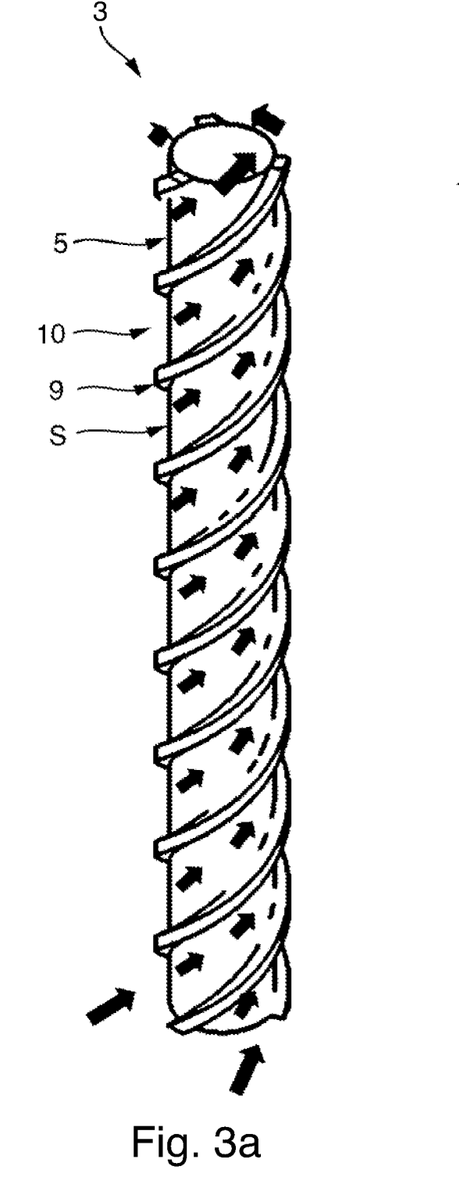
FIG. 3a shows a thermowell with a plurality of helical fins according to the state of the art forming a plurality of flow channels.

To overcome the problems associated with coherent vortex shedding, protective tubes 1 with helical fins 9 which are typically arranged on the outer cross-sectional surface S of the protective tube 3 have been suggested. An exemplarily protective tube 3 having three such helical fins 9 is shown in FIG. 3a. The helical fins 9 form flow channels 10 along the tubular member 5 and thus reduce VIV of the protective tube 3. Each flow channel 10 is formed by the volume between to adjacent helical fins 9 which proceed around the tubular member 5 along its length axis A.

Figure 3B:
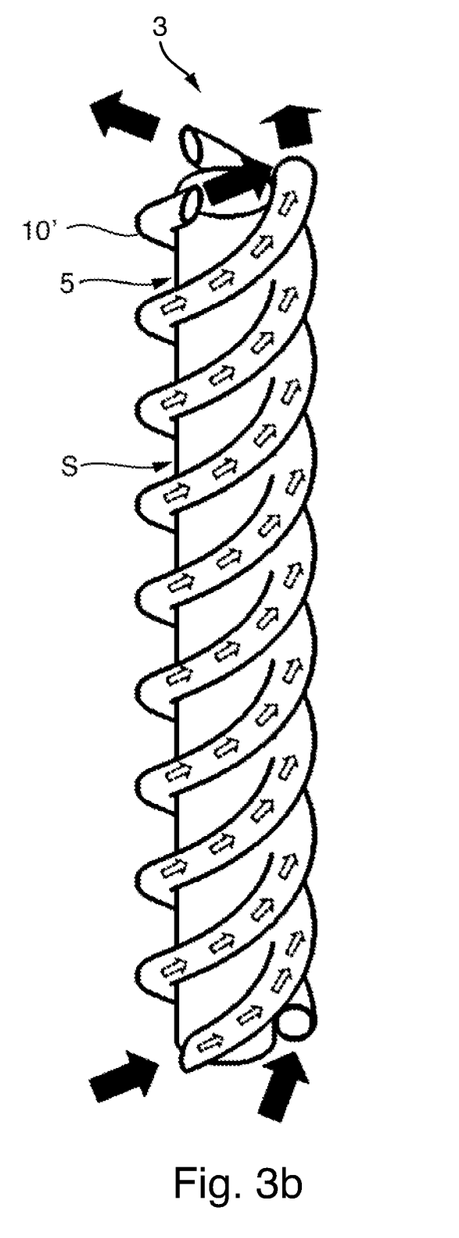
FIG. 3b shows a thermowell with flow channels optimal for avoiding VIV.

Ideally, such flow channels 10 should be closed channels 10', as illustrated in FIG. 3b. Such closed channels 10' would be able to carry medium M from the closed end section 5b towards the first end section 5a creating a suction mechanism for converting kinetic energy of the medium into pressure variations. Such variation in the flow velocity and pressure distribution would create a multidimensional motion of the medium which allows for decreasing of even suppressing VIV on the protective tube 3. Accordingly, the effectiveness of avoiding VIV is strongly related to the construction of the helical fins 9. The more the final shape resembles the ideal construction of FIG. 3b, the better the performance with respect to VIV.

Figure 4A:
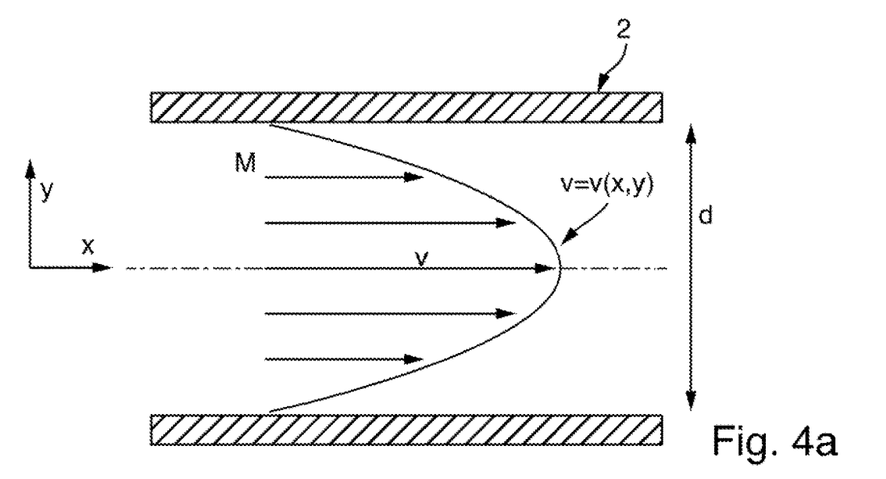
FIGS. 4a-4d illustrate the influence of the flow profile and installation position on the occurrence of VIV.
Figure 4B:
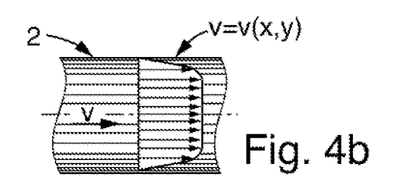
Figure 4C:
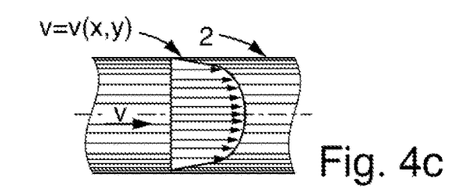

A second issue is the flow profile v(x,y) of the medium M in the pipe or vessel 2. Ideally, the flow profile v(x,y) for a circular pipe has a parabolic shape, as illustrated in FIG. 4a. Accordingly, the medium M has the highest relative velocity vrel within the center region of the pipe or vessel 2. The profile slightly varies depending on the length lp of the pipe or vessel 2, as illustrated for the case of a comparably short pipe sections 2 in FIG. 4b and a comparably long pipe section 2 for FIG. 4c.

Figure 4D:
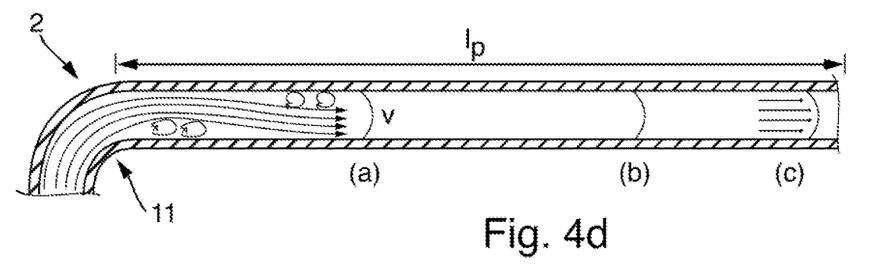

Additionally, the installation position and/or the presence of flow modifying elements 11, like the pipe corner piece shown in FIG. 4d, within a pipe/vessel 2 system may be considered as they also strongly influence the flow profile. After passing the pipe corner piece, the flow profile v(x,y) is asymmetrical (a) and only slowly transforms through several transition areas (b) to a symmetrical profile v(x,y) in a straight pipe 2 section following the pipe corner piece 11.

Since the relative velocity vrel of the medium M varies along the pipe 2 diameter d and since the installation position within a pipe system 2 highly influences the flow profile v(x,y), these quantities also strongly influence the sensitivity of a protective tube 1 regarding coherent vortex shedding.

It is an object of the present disclosure to establish an adaptive geometry which takes into account various process conditions that influence the sensitivity of a protective tube 1 towards VIV. By this procedure, the performance of a protective tube 1 subject to a flowing medium M can be highly increased. The process condition is any variable in connection with the protective tube 1, medium M properties or the geometry of the pipe or vessel 2, for example such as the flow profile v(x,y), a flow velocity v, a pressure, a temperature, a density or a viscosity of the medium M, a diameter d, volume V or roughness of the pipe or vessel 2, or a length l or diameter d of the tubular member 5.

In the following, a few examples of preferred embodiments for an optimized protective tube 1 are shown. It shall be noted that many more embodiments are possible which all do fall under the scope of the present disclosure. Additionally, the different embodiments shown can also be combined with each other.

Figure 5:
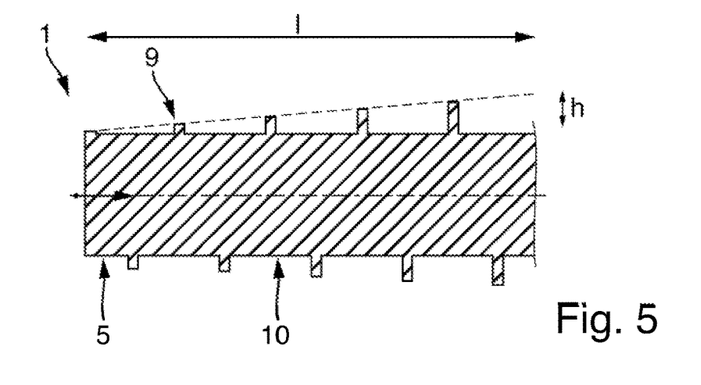
FIG. 5 shows a cross-sectional view of a first embodiment according to the present disclosure with variable helical fins.

In FIG. 5, a first embodiment of a protective tube 1 according to the present disclosure is shown. A plurality of helical fins 9 is formed on the outer surface S of a tubular member 5. The height h of the fins 9 in a radial direction extending from a surface of the tubular member 5 varies with the length l of the tubular member 5. The fins 9 have the smallest height in the end section 5b which oriented towards the pipe 2 center region. In this area, the relative velocity vrel is the highest. The height h of the fins 9 continuously increases towards a section facing the pipe 2 wall, since in this area, the relative flow velocity vrel is the smallest. The height h of the fins 9 is a function of the length l of the tubular member 5 and thus, of the flow profile v(x,y). The geometric parameter height h of the helical fins 9 is chosen in dependence on the process condition flow profile v(x,y).

Figure 6A:
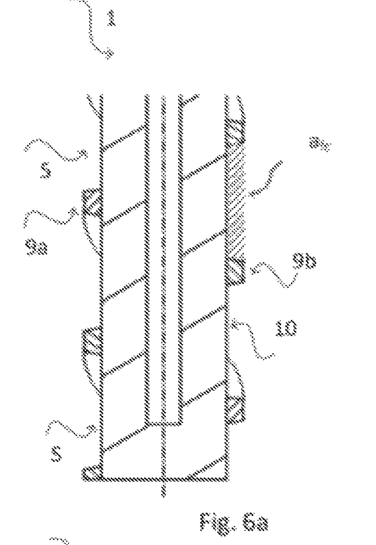
FIGS. 6a-6g show partial cross-sectional views of embodiments of a protective tube according to the present disclosure in which the area of the flow channels is optimized.

A second approach consists in optimizing a cross-sectional area afc of the flow channels 10, as illustrated in the second exemplary embodiment of FIG. 6a. Preferably, the cross-sectional area afc is designed such that it has a predefined shape and/or size, which is chosen depending on the at least one process condition of the medium M in the vessel or pipe 2. Different options exist for construction a certain cross-sectional area afc. It is possible to vary the dimensions and arrangement of the helical fins 9 and to add of remove a certain volume section from the fins 9 or the tubular member 5. Thereby, the cross-sectional area afc is defined as a cross-sectional area of the volume of a flow channel in a 2D cut of the protective tube.

Figure 6B:
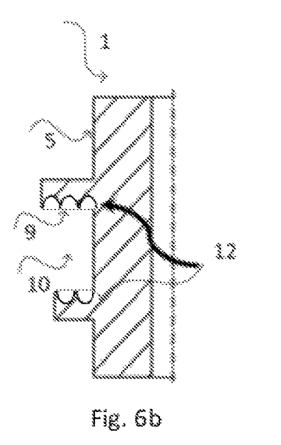
Figure 6C:
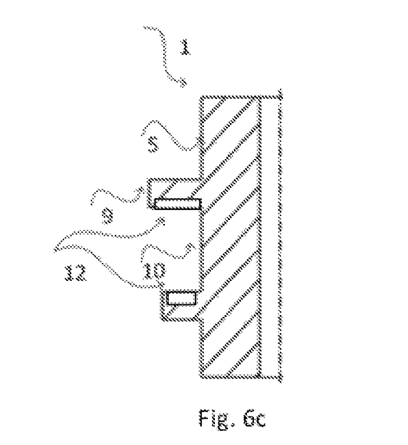
Figures 6D, 6E:
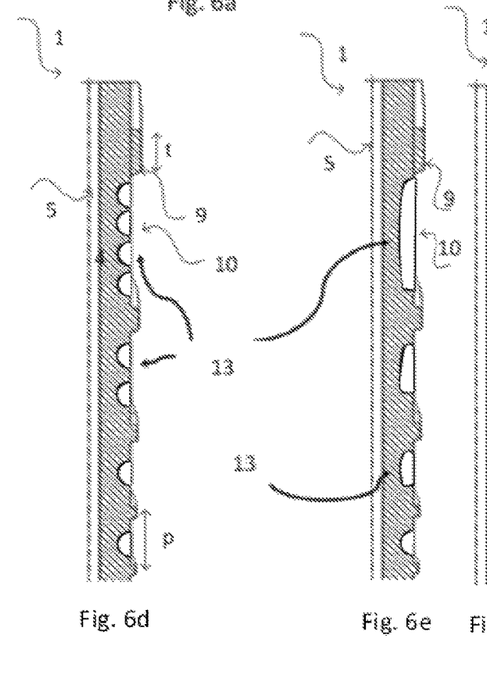
Figures 6F, 6G:
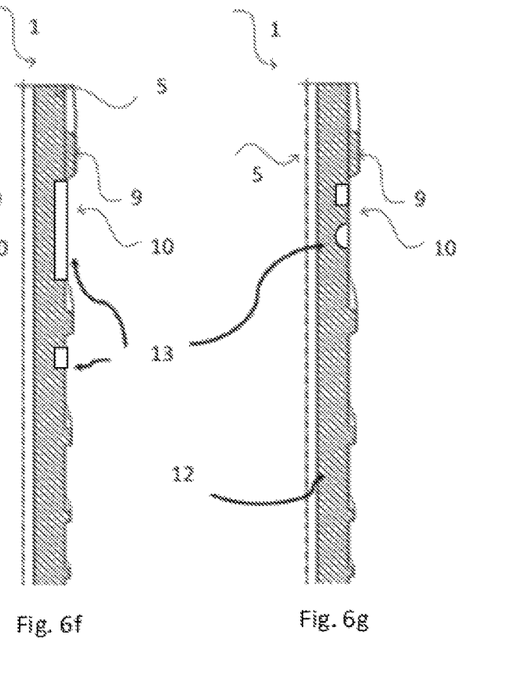

FIG. 6a shows a partial cross-section of an embodiment of the protective tube 1 with helical fins 9 that form flow channels 10 with a cross-sectional area afc. The fins 9 are differently embodied, as exemplarily shown by the two variants 9a and 9b. That way, the cross-sectional area afc varies along the length l of the tubular member. A varying height h of the fins 9 also leads to different cross-sectional areas afc along the length l of the tubular member 5, as shown in FIG. 6b and FIG. 6c. In case of FIG. 6c, additionally volume section 12 was removed from the fins 9 in order to increase the cross-sectional area afc. As illustrated in FIGS. 6d-6g, a volume section 13 can also be removed from the tubular member 5 in the area of the respective flow channel 10.

To vary this area, a volume section 12, 13 from the fins 9 or the tubular member 5 in the area of a flow channel 10 can be removed, as exemplarily illustrated in FIGS. 6b and 6c. Again, for the embodiments shown in FIGS. 6a-6g, the dimensions of the fins 9 also varies along the length of the tubular member 5. In the present case, e.g., the helical pitch p, the width t of the helical fins 9 vary along the length.

Figure 7A:
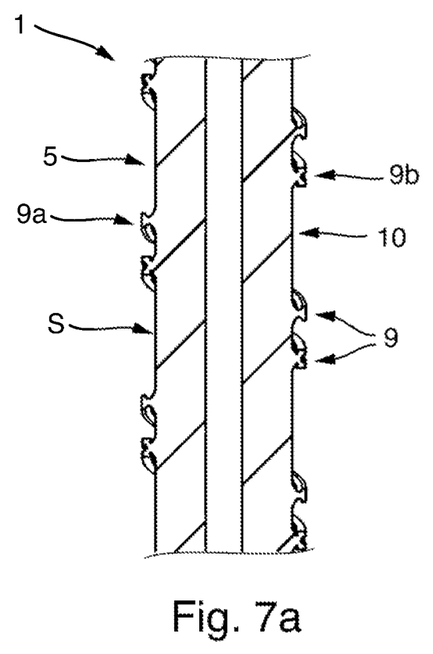
FIGS. 7a-7c show partial cross-sectional views of further embodiments according to the present disclosure having varying shapes of the helical fins.
Figure 7B:
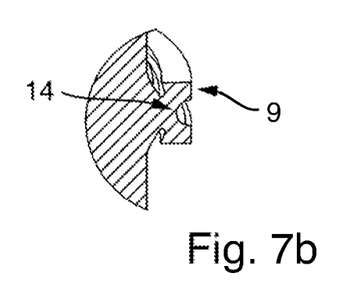
Figure 7C:
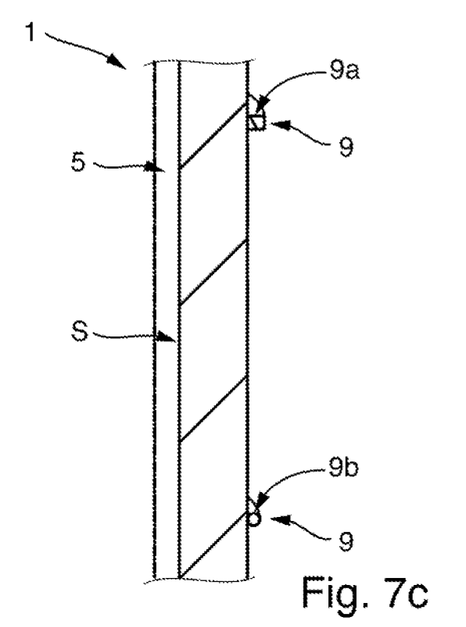

Embodiments for which the shape of the helical fins 9 varies are shown in FIGS. 7a-7c. For the protective tube 1 shown in FIG. 7a, different helical fins 9 have different shapes, as exemplarily shown for the fins 9a and 9b. FIG. 7b shows the helical fin 9b in greater detail. In contrast to the fin 9a, fin 9b has a notch 14 in its upper part. However, the shape of a specific fin 9 can also vary along the length of the tubular member 5 as shown in FIG. 7c, for which the shape of fin 9 varies from a rectangular shape 9a in a first section towards a circular shape 9b in a second section.

Figure 8A:
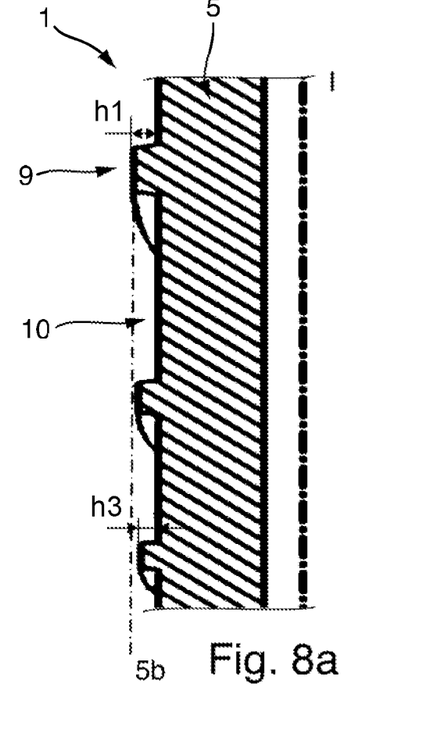
FIGS. 8a-8d show an exemplarily embodiment according to the present disclosure combining different optimization approaches.
Figure 8B:
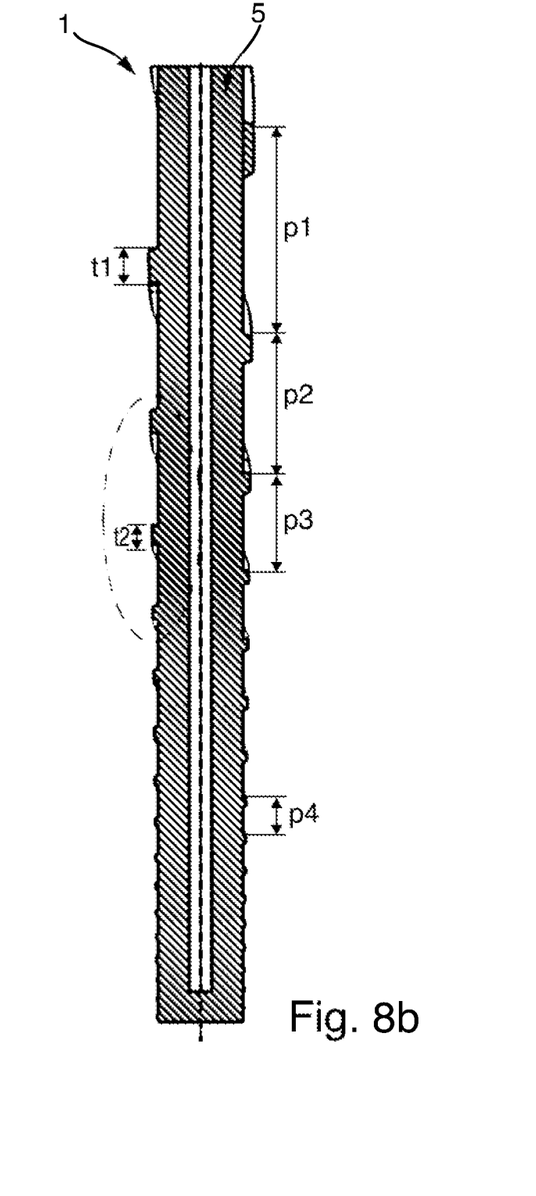
Figure 8C:
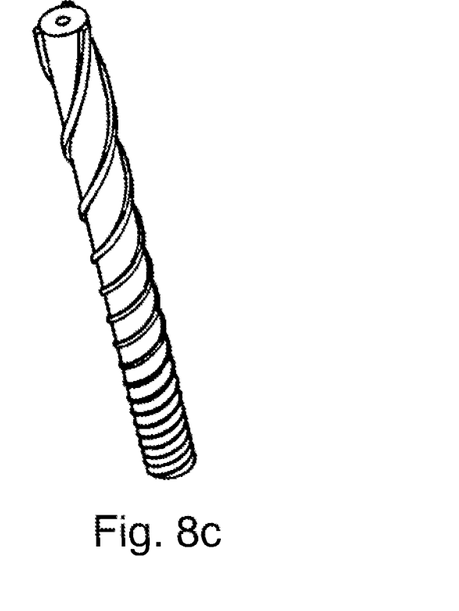

In FIGS. 8a-8d an advantageous embodiment of a protective tube 1 according to the present disclosure is shown, which combines different optimization approaches. As visible in detail view FIG. 8a, the height h1, h2, h3 in a radial direction extending from a surface of the tubular member of the helical fin 9 varies along the length of the tubular member 5. The height h1, h2, h3 decreases towards the end section 5b of the tubular member 5. As illustrated in FIG. 8b, which is a longitudinal cross-section view, additionally the helical pitch p and the fin width t parallel to a longitudinal axis of the tubular member vary along the length. Again, both quantities decrease towards the end section 5b. The resulting protective tube 1 is shown in a perspective view in FIG. 8c. The varying geometric parameters p, t and w of the helical fin 9 also lead to a varying of the dimensions of the flow channel 10.

Figure 8D:
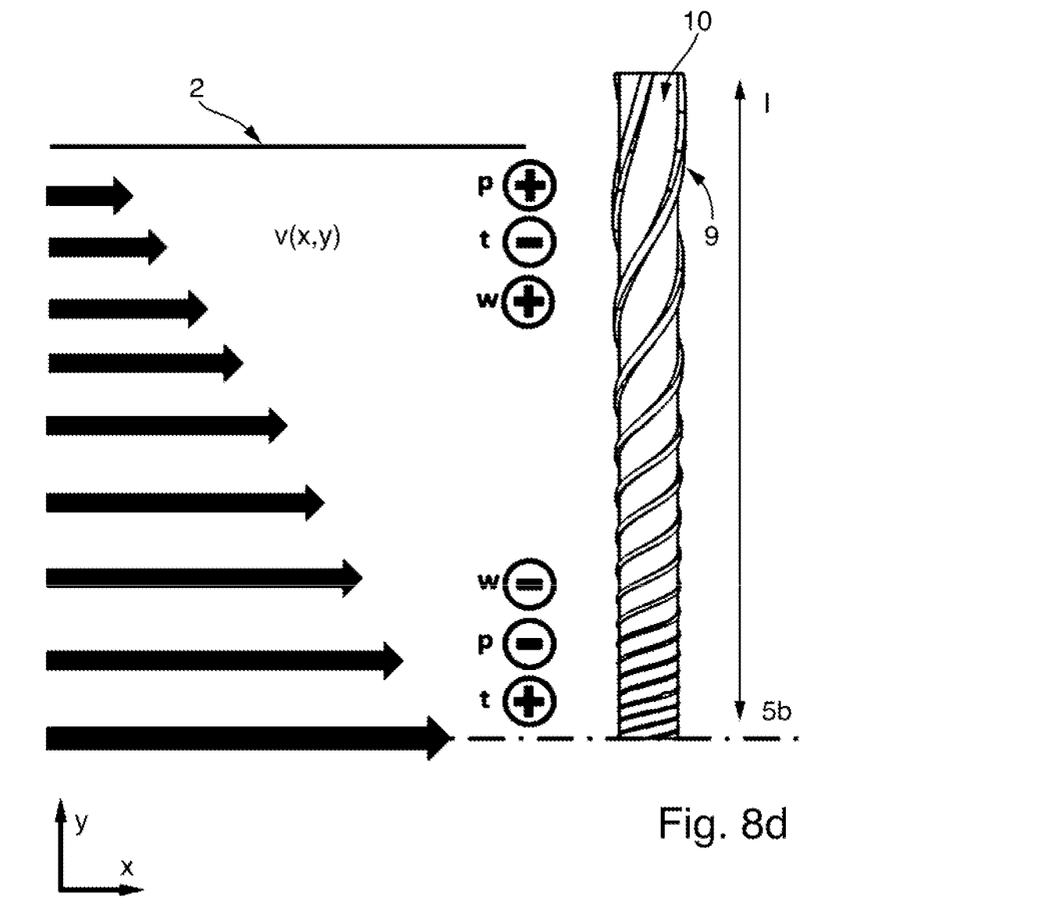

To illustrate the specific choice of geometric parameters of the helical fins 9, the protective tube 1 is shown together with the respective parabolic flow profile v(x,y) inside the pipe 2 in FIG. 8d.

To manufacture a protective tube 1 according to the present disclosure, many different approaches exist, which all fall within the scope of the present disclosure. For instance, it is possible to start from a cylindrical tubular member 5, whereas the helical fins are machined on the outer surface S of the tubular member 5. The fins 9 and the tubular member 5 might further be processed by removing or adding a volume section to achieve the optimized dimensions. Alternatively, the protective tube 1 can also be formed by means of an additive manufacturing process, e.g., by means of 3D printing or the like.

In any case, at least one geometric parameter of the at least one helical fin 9 is chosen such that it depends on at least one process condition of the medium M in the vessel or pipe 2. These geometric parameters can for instance be calculated, e.g., by means of a calculation of the mechanical behavior of the protective tube 1 inside the pipe or vessel:

$$p, t, w, a_{fc} = F(\text{velocity, flow profile, density, viscosity, pressure, pipe diameter, length of the tubular member, temperature, pipe geometry})$$

All parameters can be used to calculate the dimensions of the flow channels 10 which depend on the choice of the geometric parameters of the helical fins. Standard values for standard situation may be derived to increase the speed of the calculation for a specific application.

In the embodiments shown, the helical fins proceed along the entire length l parallel to the length axis A of the tubular member 5. However, in other embodiments, also only a given section of the tubular member 5 might be covered by helical fins 9. In this case, the size of the section carrying the at least one helical fin 9 can also be chosen in dependence of the at least one process condition.

The invention claimed is:

1. A protective tube for insertion into a pipe or vessel containing a medium, the protective tube comprising:
   a tubular member having a length and including a bore extending between a proximal end and a distal end of the tubular member; and
   at least one helical fin on at least a section of an outer surface of the tubular member, winding around the outer surface of the tubular member and defining a flow channel extending along at least a part of the tubular member,
   wherein at least a pitch, defining a first geometric parameter of the at least one helical fin, varies along the length of the tubular member, wherein the pitch decreases towards the distal end.

2. The protective tube of claim 1, wherein the protective tube is a thermowell, and the tubular member is closed at the distal end.

3. A measuring apparatus for determining and/or monitoring a process variable of a medium, the apparatus comprising a protective tube according to claim 1.

4. The apparatus of claim 3, wherein the protective tube is configured to receive a measuring insert adapted to determine and/or monitor the process variable of the medium.

5. The apparatus of claim 4, wherein the process variable is a temperature of the medium.

6. The protective tube of claim 1, wherein a second geometric parameter of the at least one helical fin varies along the length of the tubular member, wherein the second geometric parameter is one of:
   a height of the at least one helical fin, the height defined in a radial direction extending from a surface of the tubular member,
   a width of the at least one helical fin, the width defined parallel to a longitudinal axis of the tubular member,
   a cross-sectional shape of the at least one helical fin.

7. A method of manufacturing a protective tube configured for introduction into a pipe or vessel containing a medium the protective tube comprising:
   a tubular member having a length and including a bore extending between a proximal end and a distal end of the tubular member; and
   at least one helical fin on at least a section of an outer surface of the tubular member, winding around the outer surface of the tubular member and defining a flow channel extending along at least a part of the tubular member,
   the method comprising:
      selecting at least one geometric parameter of the at least one helical fin such that the at least one geometric parameter is configured based on at least one anticipated process condition of the medium in the vessel or pipe,
   wherein a first geometric parameter is a pitch of the at least one helical fin, wherein the pitch varies along the length of the tubular member, and wherein the pitch decreases towards the distal end.

8. The method of claim 7, wherein the at least one geometric parameter of the at least one helical fin is selected based on a numerical calculation of a mechanical behavior of the protective tube inside the pipe or vessel under the at least one anticipated process condition.

9. The method of claim 7, wherein the at least one geometric parameter of the at least one helical fin is selected at least in part based on an installation position and/or based on flow modifying elements within a pipe system in which the protective tube is introduced.

10. The method of claim 9, wherein the flow modifying elements comprise one of: a pipe corner piece, a valve, a filter, a nozzle and a separate measuring probe.

11. The method of claim 7, wherein a size of the at least one section of the outer surface of the tubular member, which comprises the at least one helical fin, is configured based on the at least one anticipated process condition.

12. The method of claim 7, wherein the at least one anticipated process condition is one of:
 a flow profile, a flow velocity, a pressure, a temperature, a density or a viscosity of the medium; and
 a diameter, a volume or a roughness of the pipe or vessel.

13. The method of claim 7, further comprising forming a cross-sectional area of the flow channel with a predefined shape of the cross-sectional area and/or size of the cross-sectional area, based on the at least one anticipated process condition of the medium in the vessel or pipe.

14. The method of claim 7, wherein the forming of the predefined shape of the cross-sectional area and/or size of the cross-sectional area of the flow channel comprises removing at least one volume section from the at least one helical fin and/or from a wall of the tubular member at least partially defining the flow channel.

* * * * *